(12) United States Patent
Parry et al.

(10) Patent No.: US 10,592,762 B2
(45) Date of Patent: Mar. 17, 2020

(54) METADATA BASED INTEREST POINT DETECTION

(71) Applicant: SMUGMUG, INC., Mountain View, CA (US)

(72) Inventors: David Parry, Mountain View, CA (US); Aaron Meyers, Menlo Park, CA (US); Bobby Yang, San Jose, CA (US)

(73) Assignee: SMUGMUG, INC., Mountain View, CA (US)

( * ) Notice: Subject to any disclaimer, the term of this patent is extended or adjusted under 35 U.S.C. 154(b) by 102 days.

(21) Appl. No.: 15/886,653

(22) Filed: Feb. 1, 2018

(65) Prior Publication Data

US 2018/0232594 A1    Aug. 16, 2018

Related U.S. Application Data

(60) Provisional application No. 62/539,965, filed on Aug. 1, 2017, provisional application No. 62/457,732, filed on Feb. 10, 2017.

(51) Int. Cl.
| | |
|---|---|
| G06K 9/32 | (2006.01) |
| G06T 1/00 | (2006.01) |
| G06T 7/10 | (2017.01) |
| H04L 29/08 | (2006.01) |
| G06F 16/957 | (2019.01) |
| G06F 16/438 | (2019.01) |
| G06K 9/00 | (2006.01) |

(52) U.S. Cl.
CPC ......... *G06K 9/3233* (2013.01); *G06F 16/438* (2019.01); *G06F 16/9577* (2019.01); *G06K 9/00228* (2013.01); *G06K 9/00677* (2013.01); *G06T 1/0007* (2013.01); *G06T 7/10* (2017.01); *H04L 67/02* (2013.01)

(58) Field of Classification Search
CPC ...... G06F 3/04842; G06T 11/60; G11B 27/34
See application file for complete search history.

(56) References Cited

U.S. PATENT DOCUMENTS

| | | |
|---|---|---|
| 2006/0139371 A1 | 6/2006 | Lavine et al. |
| 2010/0050080 A1 | 2/2010 | Libert et al. |
| 2010/0128986 A1 | 5/2010 | Xu |

(Continued)

OTHER PUBLICATIONS

International Search Report and Written Opinion for International Application No. PCT/US2018/016773 (SMUG/0051PC) dated Jun. 4, 2018.

(Continued)

*Primary Examiner* — Ross Varndell
(74) *Attorney, Agent, or Firm* — Patterson + Sheridan, LLP

(57) ABSTRACT

Embodiments disclosed herein generally relate to a method, system, and computer readable medium for generating a thumbnail for a media file. A web client application server receives the media file having metadata associated therewith. The web client application server generates an interest point area. The interest point area includes one or more interest points in the media file. The web client application server aligns a thumbnail area with respect to the interest point area. The web client application server displays a portion of the media file in the thumbnail area. The portion of the media file that is displayed includes at least a portion of the interest point area.

36 Claims, 13 Drawing Sheets

(56) References Cited

U.S. PATENT DOCUMENTS

| | | |
|---|---|---|
| 2010/0162172 A1 | 6/2010 | Aroner |
| 2013/0063495 A1 | 3/2013 | Milan et al. |
| 2014/0104477 A1* | 4/2014 | Choi .................. G11B 27/28 |
| | | 348/333.05 |
| 2014/0118395 A1 | 5/2014 | Jirman |
| 2014/0126819 A1* | 5/2014 | Doepke .................. G06T 7/33 |
| | | 382/173 |
| 2015/0234547 A1 | 8/2015 | Barnett et al. |
| 2015/0278605 A1 | 10/2015 | Seo et al. |

OTHER PUBLICATIONS

International Preliminary Report on Patentability for International Application No. PCT/US2018/016773 (SMUG0051PC) dated Aug. 22, 2019.

* cited by examiner

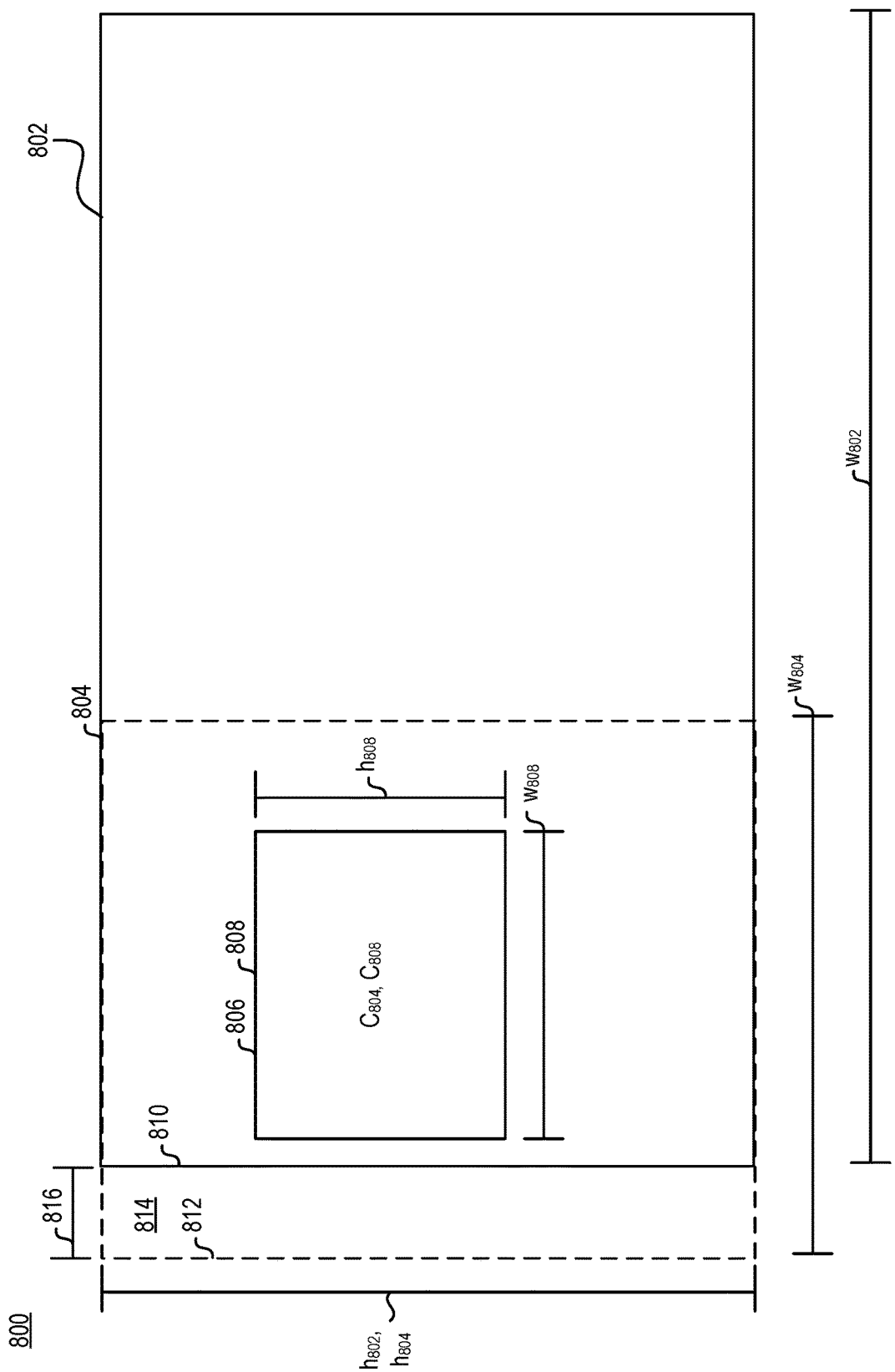

METADATA BASED INTEREST POINT DETECTION

CROSS-REFERENCE TO RELATED APPLICATIONS

This application claims benefit of U.S. Provisional Patent Application No. 62/539,965, filed Aug. 1, 2017, and U.S. Provisional Patent Application No. 62/457,732, filed Feb. 10, 2017, both of which are hereby incorporated by reference in their entirety.

BACKGROUND

Field

Embodiments of the present disclosure generally relate to a system and method for generating a thumbnail of a media file.

Description of the Related Art

The production and availability of information and media has gained prevalence in today's society. The ability to instantly access and share information, experiences, news, photos, and videos over the internet and on mobile devices has revolutionized the way people connect, learn, consume information, and participate in today's society.

In recent years, the popularity of business and personal web pages that are hosted by web service providers has increased. Examples of such web pages include profile pages on social network websites, blog web pages, online photo galleries, and the like. There exists a strong connection between a user and their web pages that has lead web page service providers to enable their customers to customize the look and feel of their web pages. For example, some web service providers allow web page users to upload photos that are displayed on their personal web pages, and/or allow web page users to edit the font size and typeface displayed on their web pages. Many web service providers further enable web page users to create a sharable photo gallery online. One popular approach to creating or adding photos to web pages is allowing the user to upload files or images stored on the device from which they are currently accessing the web page.

A user may maintain a website for various purposes and may desire to update the website periodically. One of the user's pages on the website may include a thumbnail version of each underlying media file associated with the user's account. Occasionally, the thumbnails contain characteristics which do not allow the content to be easily aesthetically pleasing. For example, a thumbnail may be displayed with various dead areas (i.e., area where no content is displayed). In other examples, the thumbnail may be formatted such that the subject of the media file is not within the thumbnail representation itself.

Accordingly, there is a need for an improved system and method for generating a thumbnail of a media file.

SUMMARY

In one embodiment, a method of generating a thumbnail for a media file is provided. The method includes receiving the media file having metadata associated therewith and generating an interest point area. The interest point area includes one or more interest point in the media file. A thumbnail area is aligned with respect to the interest point area, a portion of the media file is displayed in the thumbnail area, and the portion of the media file that is displayed includes at least a portion of the interest point area.

In another embodiment, a system is provided. The system includes a processor and a memory having instructions stored thereon, which, when executed by the processor, performs an operation of generating a thumbnail for a media file. The operation includes receiving the media file having metadata associated therewith and generating an interest point area. The interest point area includes one or more interest point in the media file. A thumbnail area is aligned with respect to the interest point area, a portion of the media file is displayed in the thumbnail area, and the portion of the media file that is displayed includes at least a portion of the interest point area.

In yet another embodiment, a non-transitory computer readable medium is provided. The non-transitory computer readable medium has instructions stored thereon, which when executed by a processor, causes the processor to perform a method of generating a thumbnail for a media file. The method includes receiving the media file having metadata associated therewith and generating an interest point area. The interest point area includes one or more interest point in the media file. A thumbnail area is aligned with respect to the interest point area, a portion of the media file is displayed in the thumbnail area, and the portion of the media file that is displayed includes at least a portion of the interest point area.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

FIG. 8A is a logical block diagram illustrating the improved technique, discussed above in conjunction with FIG. 4, of generating a thumbnail for an underlying media file, according to one embodiment disclosed herein.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments disclosed herein generally relate to a method, system, and computer readable medium for generating a thumbnail for a media file. A web client application server receives the media file having metadata associated therewith. The web client application server generates an interest point area. The interest point area includes one or more interest points in the media file. The web client application server aligns a thumbnail area with respect to the interest point area. The web client application server displays a portion of the media file in the thumbnail area. The portion of the media file that is displayed includes at least a portion of the interest point area.

The term "user" as used herein includes, for example, a person or entity that owns a computing device or wireless device; a person or entity that operates or utilizes a computing device or a wireless device; or a person or entity that is otherwise associated with a computing device or a wireless device. It is contemplated that the term "user" is not intended to be limiting and may include various examples beyond those described.

The term "media item" as used herein includes, for example, computer files, data, images, photos, documents, other such electronic media, and other resources for storing information, which is available to a computer program and which may be based on some type of durable storage. A file is durable in that it generally remains available for other programs or applications to use after the program or application that created it has finished executing.

Figure 1:
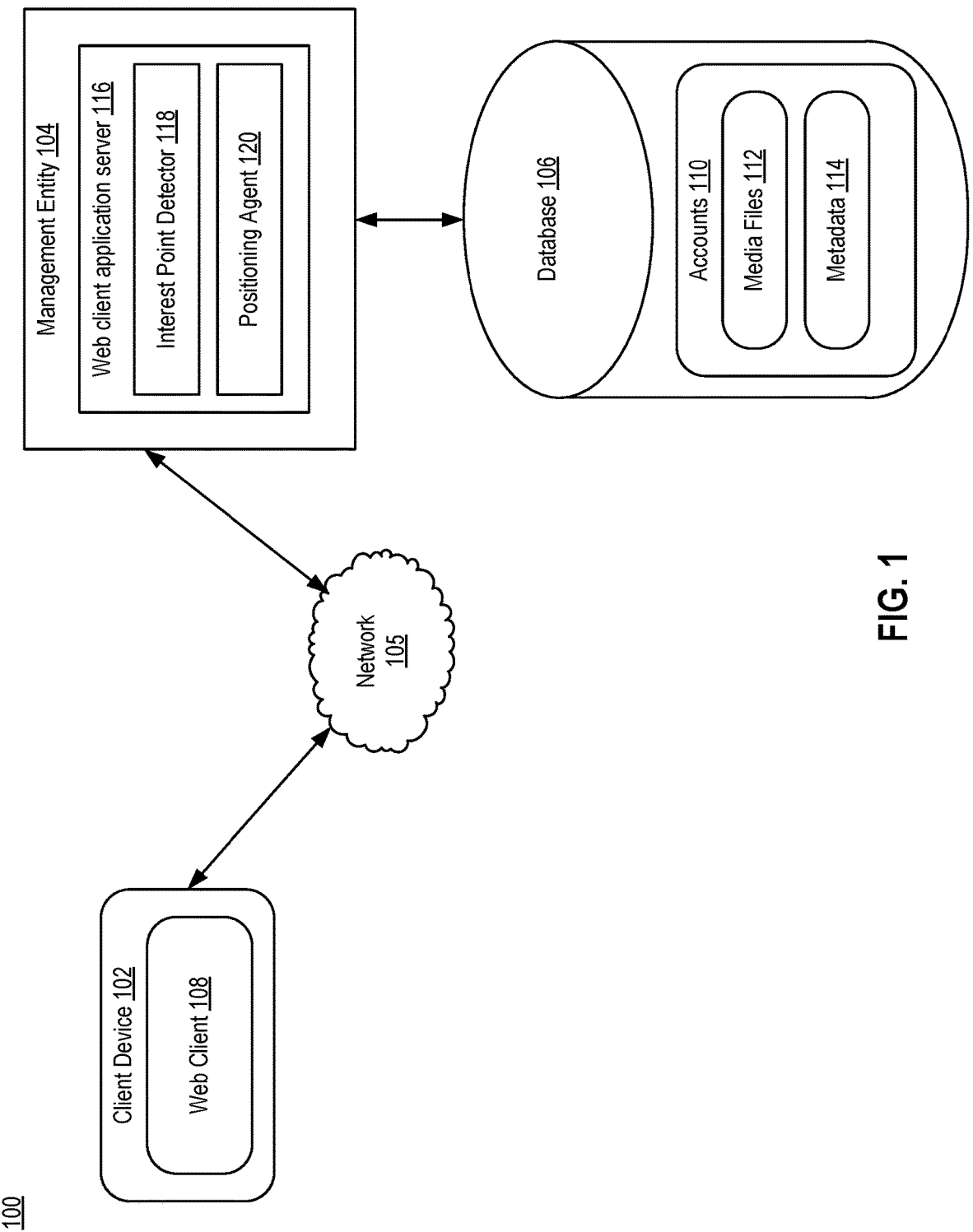
FIG. 1 illustrates a computing environment, according to one embodiment.

FIG. 1 illustrates a computing environment 100, according to one embodiment. The computing environment 100 includes a user device (also known as a client device 102), a management entity 104, and a database 106. The client device 102 may be any type of computing device accessible by a user, such as, but not limited to, a computer, a mobile device, a tablet, and the like. Generally, client device 102 may include conventional components of a computing device, e.g., a processor, system memory, hard disk drive, input/output devices, and the like. Client device 102 may include a web client 108. A user may operate client device 102 to access a functionality of the management entity 104 using web client 108. For example, web client 108 may access a photo sharing and/or image hosting website, such as that provided by SmugMug, Inc. of Mountain View, Calif.

In the embodiments described below, a user operating client device 102 may communicate over network 105 to request a webpage from web client application server 116. For example, client device 102 is configured to execute web client 108 to access webpages and/or media content managed by web client application server 116. The webpages that are displayed to a user may be transmitted from web client application server 116 to the client device 102, and subsequently processed by web client 108 for display through a graphical user interface (GUI) of the user's client device 102.

In one example, a webpage displayed on the client device 102 may be the user's own customized website. In another example, a webpage displayed on the client device 102 is an uncustomized user website, for example, a website generated by the web client application server 116. Client device 102 may access the web client application server 116 to retrieve the user's website from database 106. For example, web client application server 116 may retrieve the user's website from database 106 for display via web client 108 on client device 102. The server 116 is in communication with database 106 via network 105. For example, the server 116 may communicate with database 106 via a local connection (e.g., Storage Area Network (SAN) or Network Attached Storage (NAS)) or over the internet (e.g., a cloud based storage service. The server 116 is configured to either directly access data included in the database 106 or to interface with a database manager (not shown) that is configured to manage data included within the database 106.

User of client device 102 may be associated with one or more accounts stored in database 106. For example, as depicted, a user of client device 102 is associated with account 110 stored in database 106. In some embodiments, the user may be associated with more than one account. Generally, each user may be associated with one or more accounts stored in the database 106. The account 110 is a data object that stores data associated with user. For example, the account 110 may include information such as the user's email address, password, contact information, billing information, and the like. The account 110 may also include one or more media files 112 and metadata 114.

One or more media files 112 may comprise digital photographs, music files, video files, and the like. Each media file 112 may include metadata 114 associated therewith. Metadata 114 may include information regarding to date, time, and place the media file 112 was capture and/or uploaded, a brand of a camera capturing the media file, a focal lens of the lens used in the camera for capturing the media file, and the like. In a specific example, metadata 114 may include information regarding a point of interest in the media file 112. For example, when a media file is generated, information about that photo is automatically saved within the media file that describes certain aspects thereof. Certain metadata can be used to identify the subject of the photo and the point of interest that the user wanted to focus on when capturing the media file. In one example, the point of interest of the media file is the focus point, i.e., the spot within the frame that a camera placed into focus, which was either automatically detected by the camera or manually selected by the photographer.

A user of client device 102 may access one or more media files 112 stored in the database 106 via the web client 108 which, in turn, retrieves the online media files 112 from the database 106 and causes the media files to be displayed through the GUI of the user's client device 102. For example, the user may access a digital photograph in an online photo gallery. In this example, the user communicates with the server 116 over the network 105 to retrieve and present a media file 112 from database 106.

In some examples, a user's personal website or webpage provided by photo sharing and/or image hosting website may include one or more pages of the user's media files. Each page may include a plurality of thumbnails, with each thumbnail depicting a portion of a media file that the respective thumbnail represents. For example, FIG. 2 illustrates one embodiment of a GUI 200 of a user's personal website 202 provided by the photo sharing and/or image hosting website, according to one embodiment.

Figure 2:
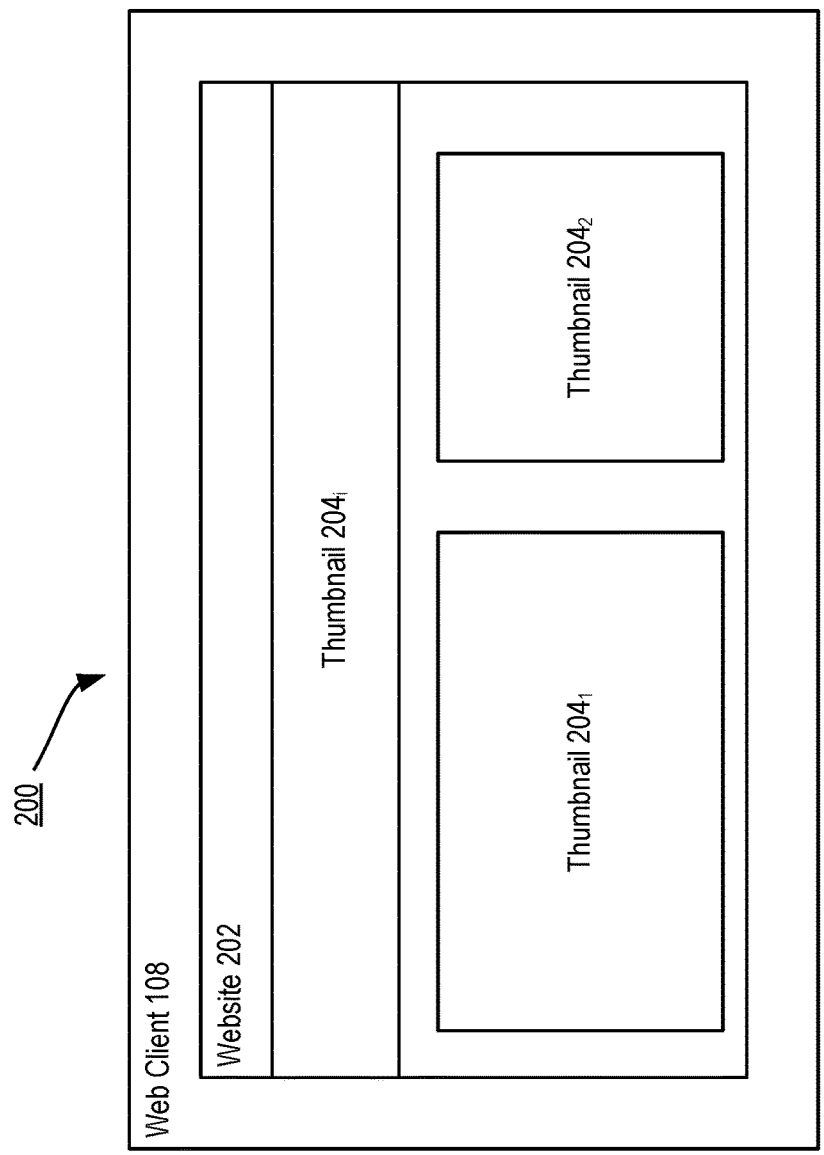
FIG. 2 illustrates one embodiment of a graphical user interface (GUI) of a user's personal website provided by the photo sharing and/or image hosting website, according to one embodiment disclosed herein.

As shown in FIG. 2, GUI 200 includes a plurality of thumbnails $204_i$. For example, GUI 200 includes thumbnails $204_1$, $204_2$ (generally, $204_i$), with each thumbnail $204_i$ representing at least a portion of a media file. In some embodiments, each thumbnail represents a portion of the media file while maintaining the scale of the underlying media file. For example, the thumbnail is similar to a cropped view of the media file while maintaining the file size and resolution of the media file. In this embodiment, the underlying media file is not compressed or reproduced with reduced resolution or a reduced file size. In other embodiments, each thumbnail represents a scaled portion of the media file. For example, a thumbnail $204_i$ may represent a scaled out (i.e., zoomed out) portion of the underlying media file. In another example, the thumbnail may represent a scaled in (i.e., zoomed in) portion of the underlying media file. Additionally, each thumbnail $204_i$ may have an orientation based on the orientation of the underlying media file. For example, if the underlying media file has a portrait orientation, then the thumbnail $204_i$ has a portrait orientation. Likewise, if the underlying media file has a landscape orientation, then the thumbnail $204_i$ has a landscape orientation. Additionally, in other embodiments, the orientation of the thumbnail $204_i$ may differ from that of the underlying media file. For purposes of the examples to follow, thumbnail $204_1$ represents a media file having a landscape orientation, and thumbnail $204_2$ represents a media file having a portrait orientation.

In some embodiments, a user may choose to have a thumbnail $204_i$ configured as a "banner" image. For example, a banner image may be defined as an image that extends across an entirety of the GUI 200 in a single direction. As illustrated in FIG. 2, thumbnail $204_3$, representing a banner image, extends across the width of the GUI 200. In other examples, thumbnail $204_3$ may extends along a height of the GUI 200. Thus, each thumbnail $204_i$ does not need to be sized similarly; rather, each thumbnail $204_i$ may have unique dimensions.

Figure 3:
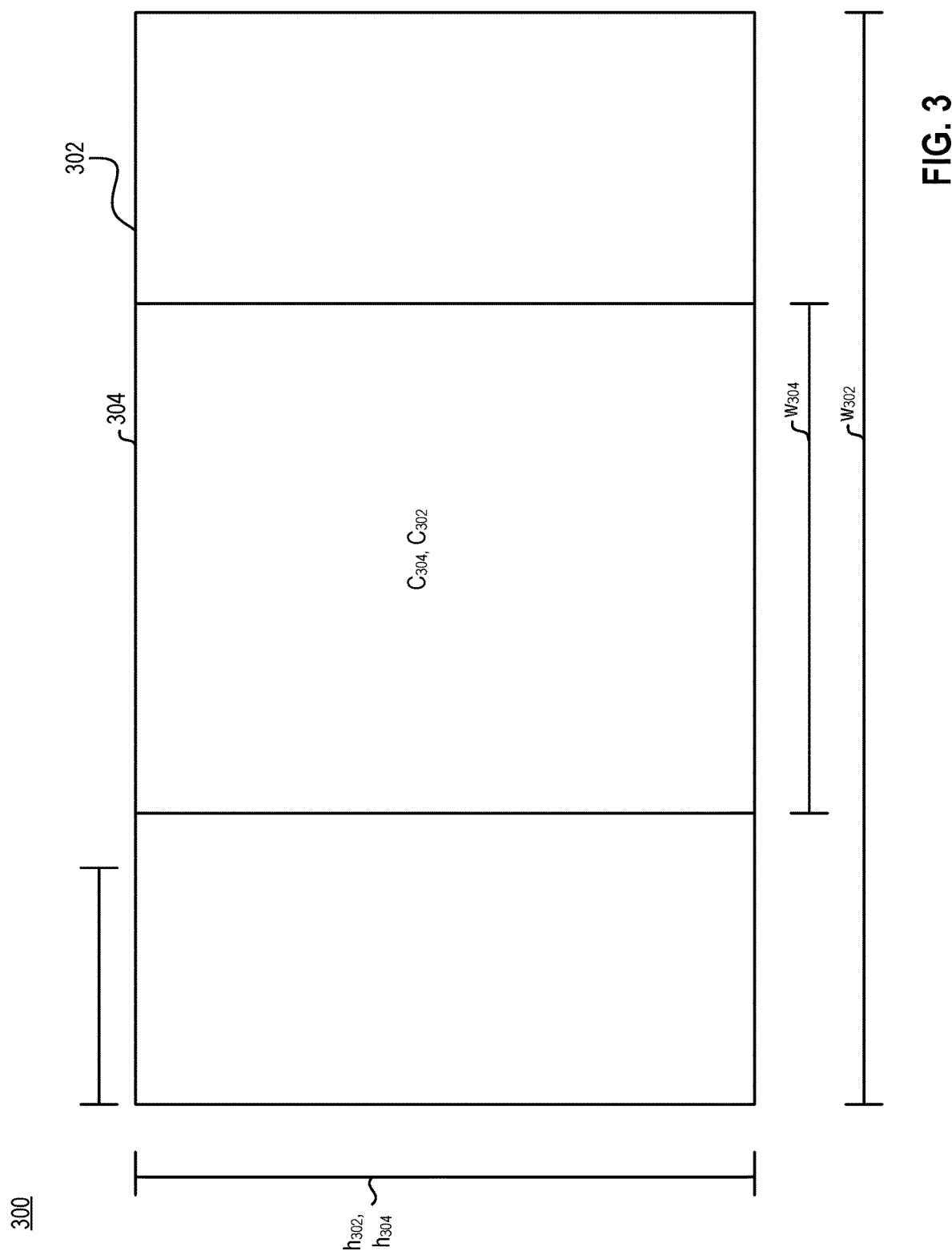
FIG. 3 is a logical block diagram illustrating a conventional technique of generating a thumbnail for an underlying media file, according to one embodiment disclosed herein.

FIG. 3 is a logical block diagram 300 illustrating a conventional technique of generating a thumbnail for an underlying media file, according to one embodiment. As shown, a media file 302 is received and/or selected for the formation of a thumbnail, such as thumbnail $204_1$ in FIG. 2. The media file 302 generally has a width, $w_{302}$, and a height, $h_{302}$. Overlaid atop the media file 302 is a thumbnail area 304, visually representing the size of the thumbnail to be displayed on user's webpage. The thumbnail area 304 generally has a width, $w_{304}$, and a height, $h_{304}$. To create the thumbnail for the user's web page, conventional techniques merely aligned a center, $C_{304}$, of the thumbnail area 304 with a center, $C_{302}$, of the media file 302. Such aligning of the center of thumbnail area 304 with the center of the media file 302 has proven to have several drawbacks. For example, an offset face in the media file may be cut off, or completely exterior to, the thumbnail area 304 if the face is far enough from the center, $C_{302}$, of the thumbnail area.

When a media file is captured, information about that media file (e.g., information that describes certain aspects of the media file) may be automatically saved within the media file. For example, certain information contained in the metadata may be used to identify a subject of the media file and/or the point of interest of the media file on which the user intended the viewer to focus. A specific example would be a focus point, i.e., the location within the frame that a camera is placed into focus, which was either automatically detected by the camera or manually selected by the photographer. In another embodiment, metadata embedded in the media file is added to the media file post-capture, for example, by post-capture editing of the media file. The metadata of the media file may be leveraged when displaying media files in a thumbnail, by detecting the point of interest in the media file and positioning the point of interest of the media file within the thumbnail area.

Additionally, a point of interest of the photo may be derived from suitably equipped digital cameras which automatically detect faces and other objects within the photo and embed this information in the metadata of the media file. In certain embodiments, the point of interest of the photo is detected by analysis performed by the web client application server 116 or a by third party image recognition analysis. The interest point detector 118 is configured to identify one or more interest points in the media file. For example, the interest point detector 118 may scan the metadata associated with a media file to determine the one or more interest points in the media file. Additionally, the positioning agent 120 may subsequently position the thumbnail within the media file such that the thumbnail captures the interest points.

Figure 4:
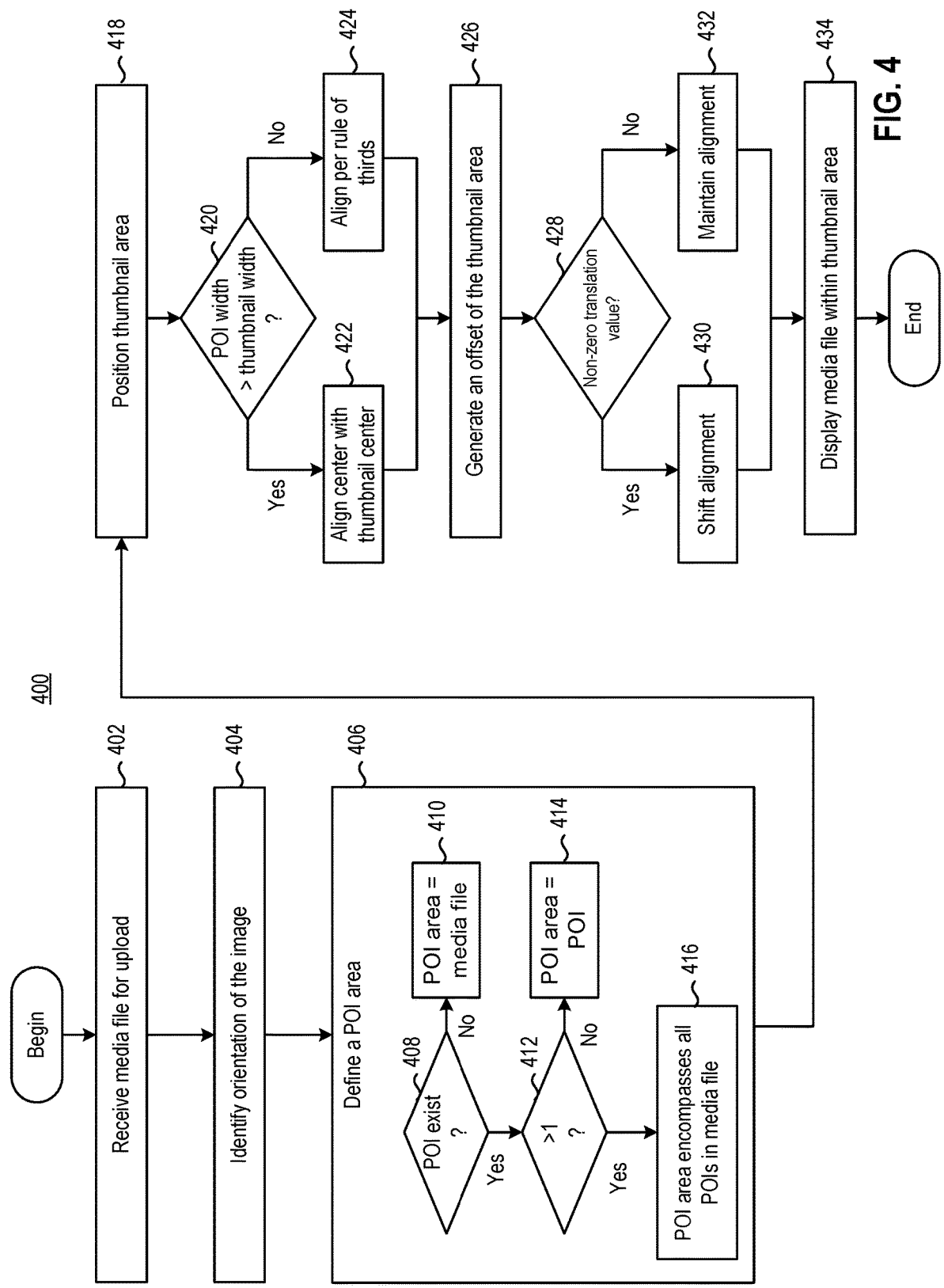
FIG. 4 is a flow diagram of a method for generating a thumbnail of a media file, according to one embodiment disclosed herein.

FIG. 4 is a flow diagram of a method 400 for generating a thumbnail of a media file, according to one embodiment. The method 400 begins at step 402. At step 402, web client application server 116 receives a media file for upload. In one example, web client application server 116 receives the media file from client device 102 via an upload client (not shown). In this example, web client application server 116 automatically generates the thumbnail for the media file as the media file is uploaded to database 106. In another example, web client application server 116 may receive a selection of a pre-existing media file in database 106 by the user. Thus, method 400 may be both automatically applied to media files as each media file is uploaded to database 106, and to previously existing media files 112 in database 106.

At step 404, positioning agent 120 identifies an orientation of the media file 112. For example, positioning agent 120 identifies whether the media file 112 has a portrait orientation or a landscape orientation. For method 400, determining the orientation of the media file 112 may dictate which dimension is preserved during the thumbnail generation. In one embodiment, if positioning agent 120 determines that the media file 112 has a portrait orientation (i.e., the width of the portrait is greater than the height of the portrait), then the height of the portrait is maintained in the thumbnail area. In an alternate embodiment, the positioning agent 120 is disabled and/or the positioning agent 120 allows for the height of the portrait in the thumbnail area to be changed. In one embodiment, if positioning agent 120 determines that the media file 112 has a landscape orientation (i.e., the height of the portrait is greater than the width of the portrait), then the width of the portrait is maintained in the thumbnail area. In an alternate embodiment, the positioning agent 120 is disabled and/or the positioning agent 120 allows for the width of the portrait in the thumbnail area to be changed. For purpose of the discussion in conjunction with FIGS. 4-8, assume that the media file 112 has a landscape orientation. The following discussion may be generalized to a portrait orientation. For example, the following discussion may be generalized to a portrait orientation by swapping the dimensions mentioned below.

At step 406, interest point detector 118 defines a point of interest area in the media file 112. As defined above, the point of interest of the media file 112 may be the subject of the media file 112, such as a face or object depicted in the media file 112. Interest point detector 118 determines whether a point of interest exists in the media file 112 (step 408). For example, interest point detector 118 may access metadata 114 associated with the media file 112. Interest point detector 118 scans the metadata 114 to determine whether the metadata 114 includes information directed to the point of interest in the media file 112.

In some examples, the interest point detector 118 may determine that the media file 112 does not contain a point of interest. For example, the interest point detector 118 scans the metadata 114 associated with the media file 112 and determines that no point of interest exists. In another example, there may not exist any metadata associated with the media file 112 for which the interest point detector 118 can scan. If the interest point detector 118 determines that the media file 112 does not contain a point of interest, then at step 410, the interest point detector 118 defines the entire media file 112 itself as the point of interest area. Accordingly, method 400 would proceed under the conventional technique of generating a thumbnail by aligning the media file 112 center with the thumbnail area center.

If, however, the interest point detector 118 determines that a point of interest in the media file does exist, then at step 412, the interest point detector 118 determines whether more than one interest point exists. A given media file 112 may include one or more points of interest. For example, a family portrait may include a point of interest directed to a face of each member of the family. In another example, a picture of a person standing with an animal may include a first interest point directed to the face of the person, and a second interest point directed to a face of the animal. In another example, a media file may contain a person wearing an intrinsic top hat. In this example, a first point of interest may be the face of the person, and a second point of interest may be the top hat.

Figure 5:
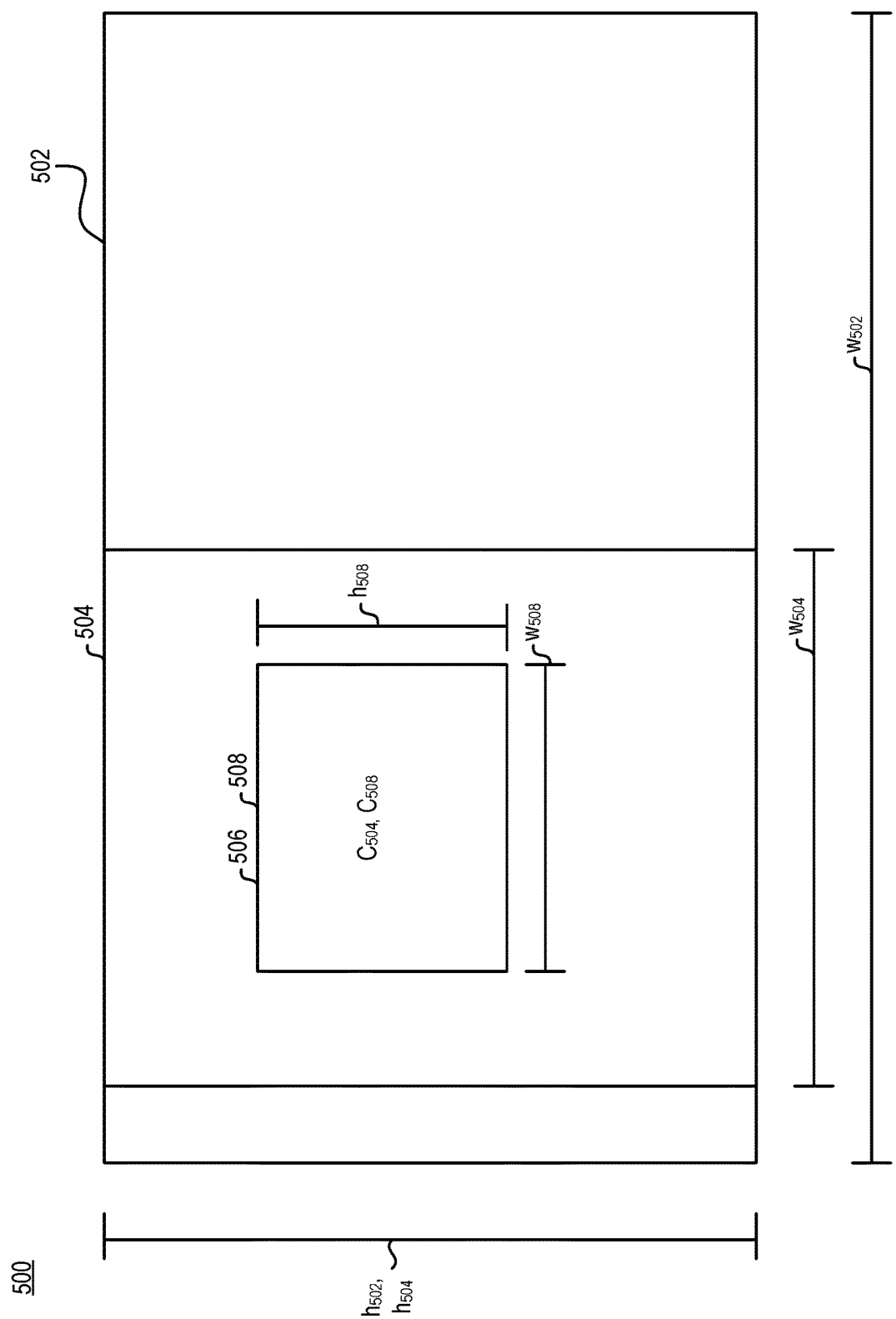
FIG. 5 is a logical block diagram illustrating the improved technique, discussed above in conjunction with FIG. 4, of generating a thumbnail for an underlying media file, according to one embodiment disclosed herein.

If the interest point detector 118 determines that there is not greater than one point of interest in the media file, then at step 414, the interest point detector 118 defines the point of interest area to include the lone point of interest in the media file. For example, FIG. 5 is a logical block diagram 500 illustrating the improved technique, discussed above in conjunction with FIG. 4, of generating a thumbnail for an underlying media file, according to one embodiment. As illustrated, a thumbnail area 504 is overlain atop a media file 502. Media file 502 has height, $h_{502}$, and width, $w_{502}$. The thumbnail area 504 has a width, $w_{504}$, and a height, $h_{504}$. In this example, the height, $h_{502}$, is preserved; thus, the height, $h_{502}$, of the thumbnail area is substantially equal to the height, $h_{502}$, of the media file 502. As shown, the width, $w_{504}$, of the thumbnail area 504 is less than the width, $w_{502}$, of the media file 502. In the embodiment depicted in FIG. 5, interest point detector 118 has identified a single interest point 506. Accordingly, interest point detector 118 defines the interest point 506 as an interest point area 508. The interest point area 508 has a height, $h_{508}$, and a width, $w_{508}$.

Figure 6:
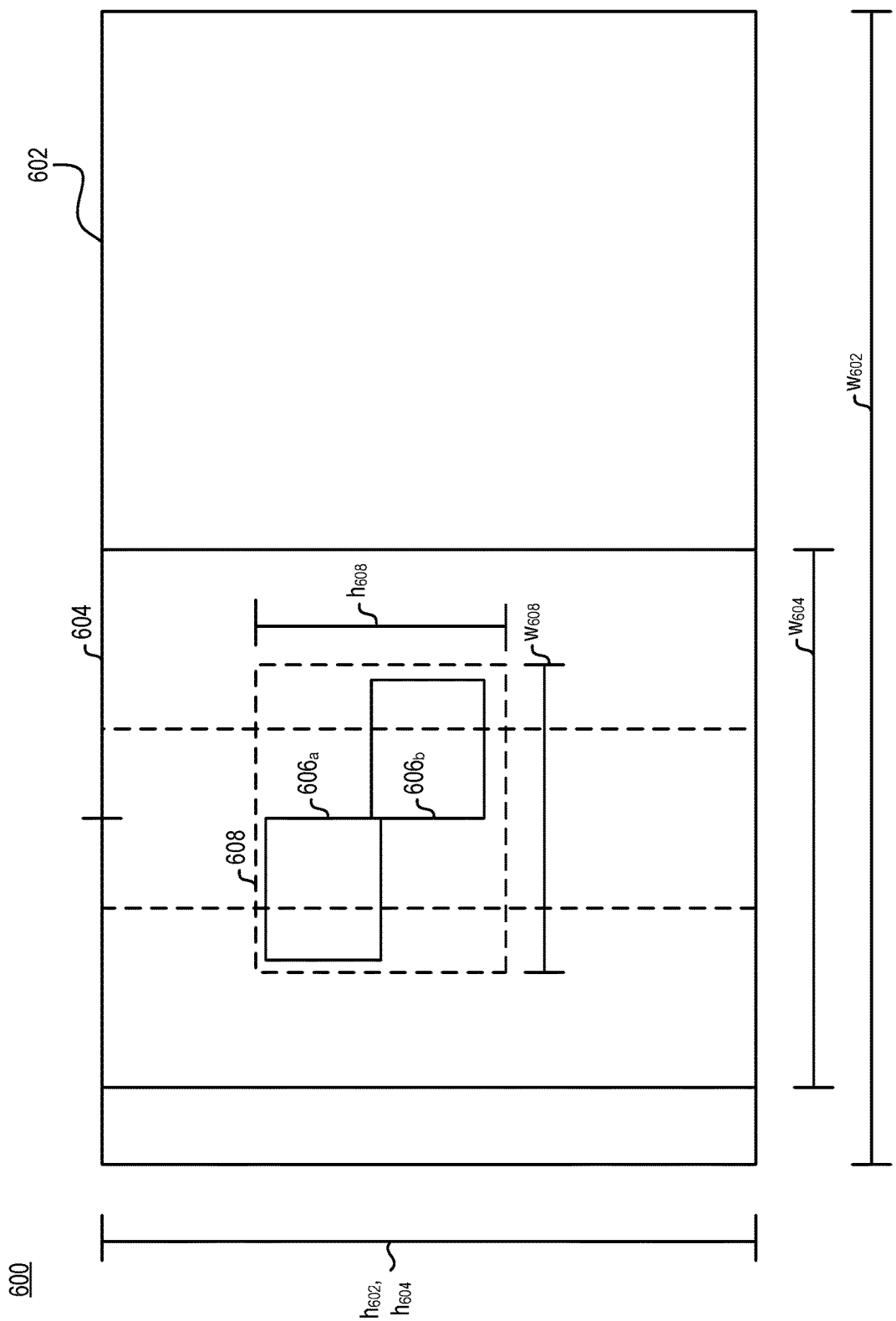
FIG. 6 is a logical block diagram illustrating the improved technique, discussed above in conjunction with FIG. 4, of generating a thumbnail for an underlying media file, according to one embodiment disclosed herein.

Referring back to FIG. 4, if, however, interest point detector 118 determines that there is greater than one point of interest in the media file, then at step 416, the interest point detector 118 defines the point of interest area to include each point of interest in the media file. For example, FIG. 6 is a logical block diagram 600 illustrating the improved technique, discussed above in conjunction with FIG. 4, of generating a thumbnail for an underlying media file, according to one embodiment. As illustrated, a thumbnail area 604 is overlain atop the media file 602. Media file 602 has height, $h_{602}$, and width, $w_{602}$. The thumbnail area 604 has a width, $w_{604}$, and a height, $h_{604}$. In this example, the height, $h_{602}$, is preserved; thus, the height, $h_{604}$, of the thumbnail area is substantially equal to the height, $h_{602}$, of the media file 602. As shown, the width, $w_{604}$, of the thumbnail area 604 is less than the width, $w_{602}$, of the media file 602. In the embodiment depicted in FIG. 5, interest point detector 118 has identified two single interest points $606_a$ and $606_b$. Accordingly, interest point detector 118 defines an interest point area 608 to bound both interest point $606_a$ and interest point $606_b$. The interest point area 608 has a height, $h_{608}$, and a width, $w_{608}$.

Referring back to FIG. 4, after the interest point area (e.g., interest point area 508, interest point area 608) is defined, at step 418, positioning agent 120 positions the thumbnail area with respect to the interest point area. The area of the interest point area is the numerical area of the portion of the media file that the interest point area spans. For example, using the interest point area 608 of FIG. 6, the area would be the height multiplied by the width, i.e., $h_{608} \times w_{608} = A_{608}$.

At step 420, the positioning agent 120 determines whether the width of interest point area is greater than width of the thumbnail area. If the positioning agent 120 determines that the width of interest point area is greater than a scalar multiple of the width of the thumbnail area, then at step 422, positioning agent 120 aligns a center of the thumbnail area with a center of the interest point area. In a specific example, the positioning agent 120 compares the width of the interest point area to 50% the width of the thumbnail area. If the positioning agent 120 determines that the width of the interest point area is greater than 50% of the width of the thumbnail area, then positioning agent 120 aligns a center of the thumbnail area with a center of the interest point area. Mathematically, this may be represented as $w_{interest point area} > 0.5 \, (w_{thumbnail area})$.

Referring back to FIG. 5, the positioning agent 120 calculates the width of the interest point area 508. The positioning agent 120 would then compare the width of the interest point area 508 to the width of the thumbnail area 504 height. As illustrated, the interest point area 508 width, $w_{508}$, is greater than 50% of the width of the thumbnail area 504. Accordingly, the center, $C_{504}$, of the thumbnail area 504 is aligned with the center, $C_{508}$, of the interest point area 508.

Referring back to FIG. 4, if, however, at step 420 the positioning agent 120 determines that the width of the interest point area is less than a scalar multiple of the width of the thumbnail area, then at step 424, the positioning agent 120 aligns the thumbnail area according to a predefined set of rules, such as the rule of thirds or the like. In one embodiment, the predefined set of rules enables cropping of the media file with improved aesthetic characteristics to improve display of the thumbnail area. In a specific example, the positioning agent 120 compares the interest point area width to 50% of the thumbnail area width. If the positioning agent 120 determines that the interest point area width is less than 50% of the thumbnail area width, then positioning agent 120 aligns the thumbnail area according to the predefined set of rules. Mathematically, this may be represented as $w_{interestpointarea} < 0.5(w_{thumbnailarea})$.

Figure 7:
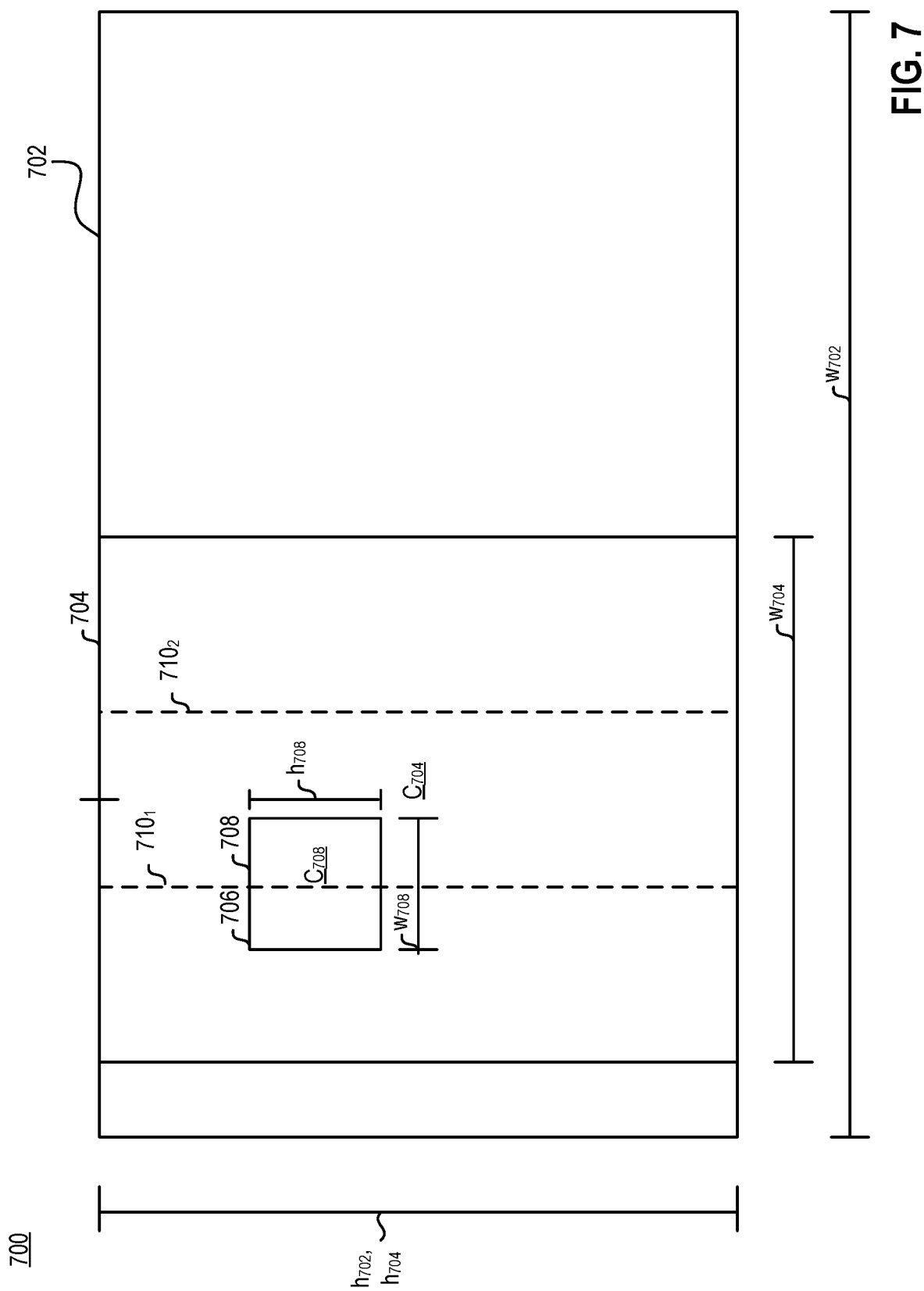
FIG. 7 is a logical block diagram illustrating the improved technique, discussed above in conjunction with FIG. 4, of generating a thumbnail for an underlying media file, according to one embodiment disclosed herein.
Figure 8B:
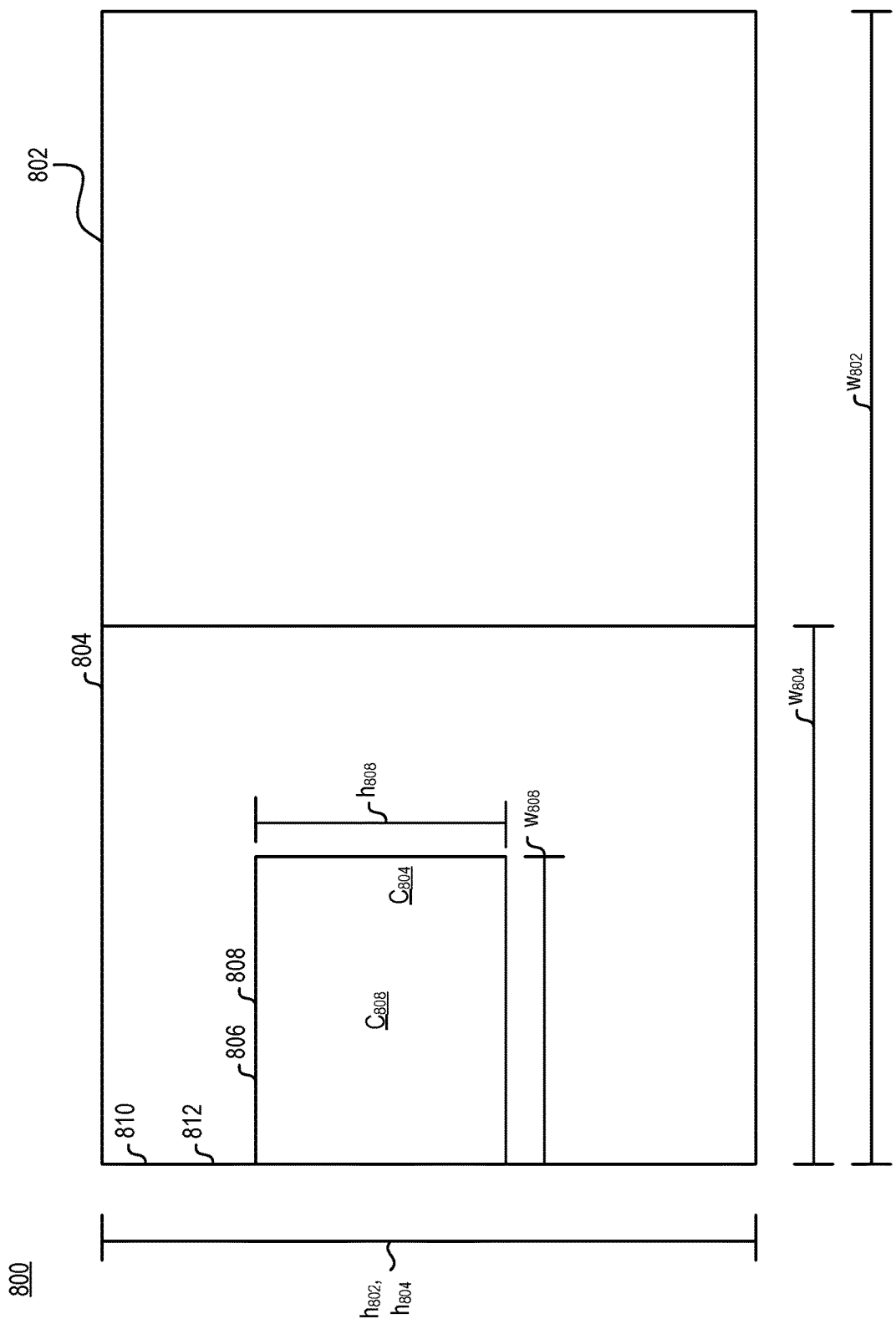
FIG. 8B is a logical block diagram illustrating the improved technique, discussed above in conjunction with FIG. 4, of generating a thumbnail for an underlying media file, according to one embodiment disclosed herein.

FIG. 7 is a logical block diagram 700 illustrating the improved technique, discussed above in conjunction with FIG. 4, of generating a thumbnail for an underlying media file, according to one embodiment. As illustrated, a thumbnail area 704 is overlain atop the media file 702. Media file 702 has a height, $h_{702}$, and a width, $w_{702}$. Thumbnail area 704 has a height, $h_{704}$, and a width, $w_{704}$. In the media file 702, the interest point detector 118 has identified interest point area 708 containing interest point 706. Interest point area 708 has a height, $h_{708}$, and a width, $w_{708}$. As illustrated, the interest point area 708 has a width, $w_{708}$, that is less than 50% of the width, $w_{704}$, of the thumbnail area 704.

The predefined set of rules allows the positioning agent 120 to position the interest point area 708 within the thumbnail area 704, at a position other than the center, $C_{704}$, of the thumbnail area 704. For example, as shown in phantom, horizontal lines $710_1$, $710_2$ denote alternative positions to align a center of the thumbnail area 704, responsive to determining that the width of interest point area 708 is less than 50% the width of the thumbnail area 704. In the current example illustrated in FIG. 7, rather than aligning the center, $C_{704}$, of the thumbnail area with the center, $C_{708}$, of the interest point area 708, the positioning agent 120 aligns the center, $C_{704}$, of the thumbnail area 704 with the line $710_1$, denoting the end boundary of a first third of the thumbnail area 704.

Referring back to FIG. 4, the positioning agent generates an offset of the thumbnail area (step 426). An offset may be needed in situations in which the interest point of the media file is near a boundary of the media file. For example, an offset may be needed in a situation where the interest point of the media file is in a position where, if the center of the thumbnail area is aligned with the center of the interest point area, a portion of the thumbnail area extends past the media file.

For example, FIG. 8A is a logical block diagram 800 illustrating the improved technique, discussed above in conjunction with FIG. 4, of generating a thumbnail for an underlying media file, according to one embodiment. As illustrated, a thumbnail area 804 is overlain atop the media file 802. Media file 802 has a height, $h_{802}$, and a width, $w_{802}$. Thumbnail area 804 has a width, $w_{804}$, and a height, $h_{804}$, which is equal to the height, $h_{802}$ of the media file 802, as the media file 802 has a landscape orientation. In the media file 802, the interest point detector 118 has identified interest point area 808 containing interest point 806. Interest point area 808 has a height, $h_{808}$, and a width, $w_{808}$. The interest point area 808 has an outer bound 812, which extends past an outer bound 810 of the media file. The outer bound 812 and the outer bound 810 define an overlap area 814 having a length 816. Accordingly, without adjusting the interest point area 808 to account for the overlap area 814, when displayed, the thumbnail area 804 would include black and/or white areas corresponding to overlap area 814. In another embodiment, the overlap area 814 is transparent which shows the characteristics/colors of the thumbnail area 804 corresponding to the overlap area 814.

Referring back to FIG. 4, the positioning agent determines if there is a non-zero translation value of the interest point area at step 428. To determine if there is a non-zero translation value of the interest point area, the positioning agent calculates the length of the overlap area, and subsequently shifts the thumbnail area an amount substantially equal to the length to offset the overlap area. Illustratively, in FIG. 8B, the thumbnail area 804 is translated an amount to the right to offset the overlap area 814 in FIG. 8A. For example, if the thumbnail area 804 extends past the boundary 810 of the media file 802 by 20%, the positioning agent 120 would subsequently translate the thumbnail area 804 in an amount of 20% to the right to offset the overlap. Accordingly, the center, $C_{804}$, of thumbnail area 804 is not necessarily aligned with either the center, $C_{808}$, of the interest point area (step 422) or with according to the predefined set of rules (step 424).

Accordingly, if there is a non-zero overlap value of the interest point area, then at step 430, the positioning agent 120 translates the thumbnail area an amount to offset the non-zero overlap value. If, however, the overlap value is zero (i.e., there is no overlap of the thumbnail area over the media file), then at step 432, the positioning agent 120 maintains the alignment (i.e., maintains the alignment determined in steps 422, 424).

After the positioning agent 120 generates the offset, at step 434, the web client application server 116 displays the thumbnail on the user's webpage. The thumbnail includes the all information of the media file captured in the thumbnail area.

Figure 9:
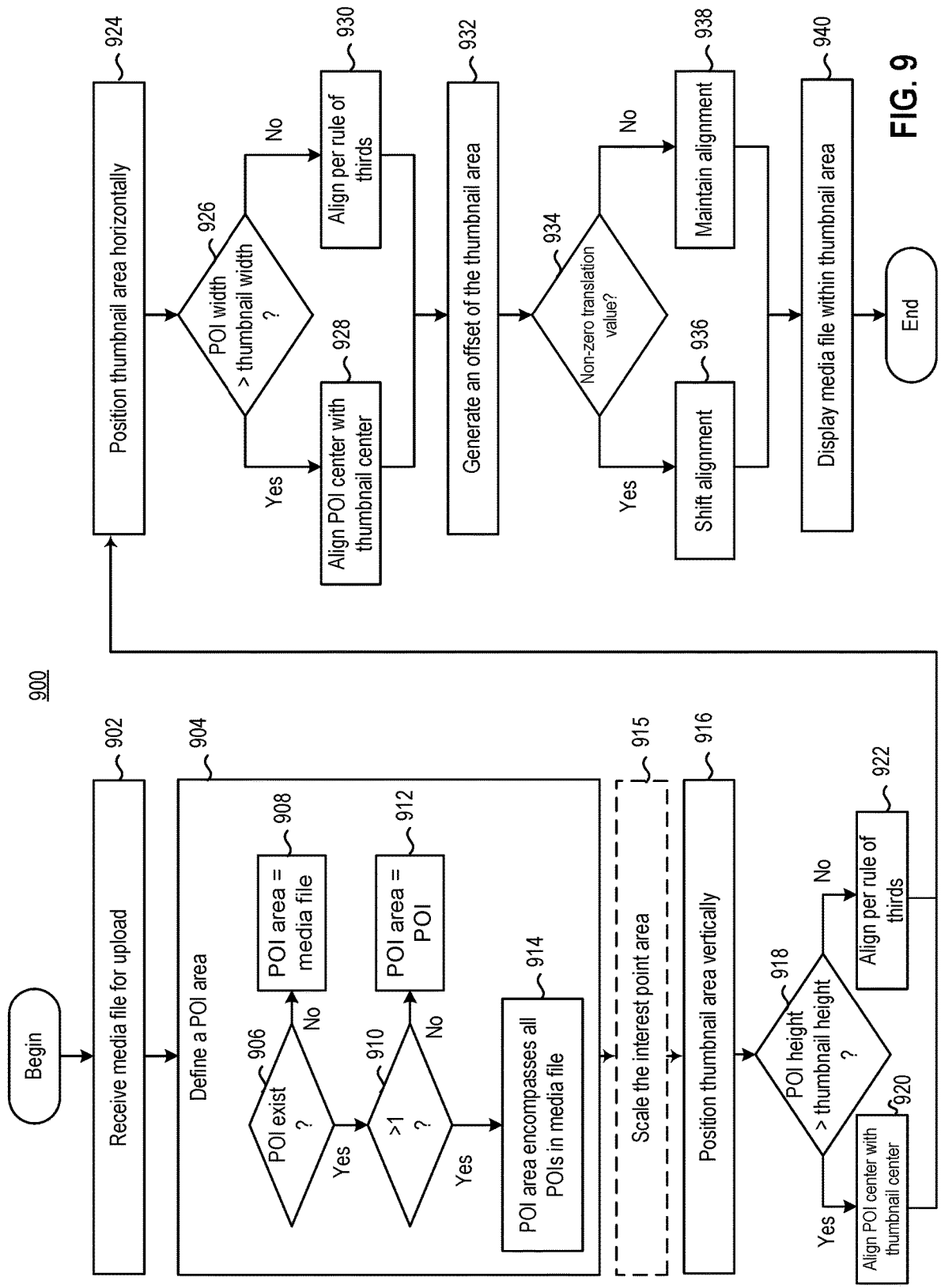
FIG. 9 is a flow diagram of a method for generating a thumbnail of a media file, according to one embodiment disclosed herein.

FIG. 9 is a flow diagram of a method 900 for generating a thumbnail of a media file, according to one embodiment. The method 900 begins at step 902. At step 902, web client application server 116 receives a media file for upload. In one example, web client application server 116 receives the media file from client device 102 via an upload client (not shown). In this example, web client application server 116 automatically generates the thumbnail for the media file as the media file is uploaded to database 106. In another example, web client application server 116 may receive a selection of a pre-existing media file in database 106 by the user. Thus, method 900 may be both automatically applied to media files as each media file is uploaded to database 106, and to previously existing media files 112 in database 106.

At block 904, interest point detector 118 defines a point of interest area in the media file 112. Interest point detector 118 determines whether a point of interest exists in the media file 112 (step 906). For example, interest point detector 118 may access metadata 114 associated with the media file 112. Interest point detector 118 scans the metadata 114 to determine whether the metadata 114 includes information directed to the point of interest in the media file 112.

In some examples, the interest point detector 118 may determine that the media file 112 does not contain a point of interest. For example, the interest point detector 118 scans the metadata 114 associated with the media file 112 and determines that no point of interest exists. In another example, there may not exist any metadata associated with the media file 112 for which the interest point detector 118 can scan. If the interest point detector 118 determines that the media file 112 does not contain a point of interest, then at step 908, the interest point detector 118 defines the entire media file 112 itself as the point of interest area. Accordingly, method 900 would proceed under the conventional technique of generating a thumbnail by aligning the media file 112 center with the thumbnail area center.

If, however, the interest point detector 118 determines that a point of interest in the media file does exist, then at step 910, the interest point detector 118 determines whether more than one interest point exists. A given media file 112 may include one or more points of interest. For example, a family portrait may include a point of interest directed to a face of each member of the family. In another example, a picture of a person standing with an animal may include a first interest point directed to the face of the person, and a second interest point directed to a face of the animal. In another example, a media file may contain a person wearing an intrinsic top hat. In this example, a first point of interest may be the face of the person, and a second point of interest may be the top hat.

Figure 10:
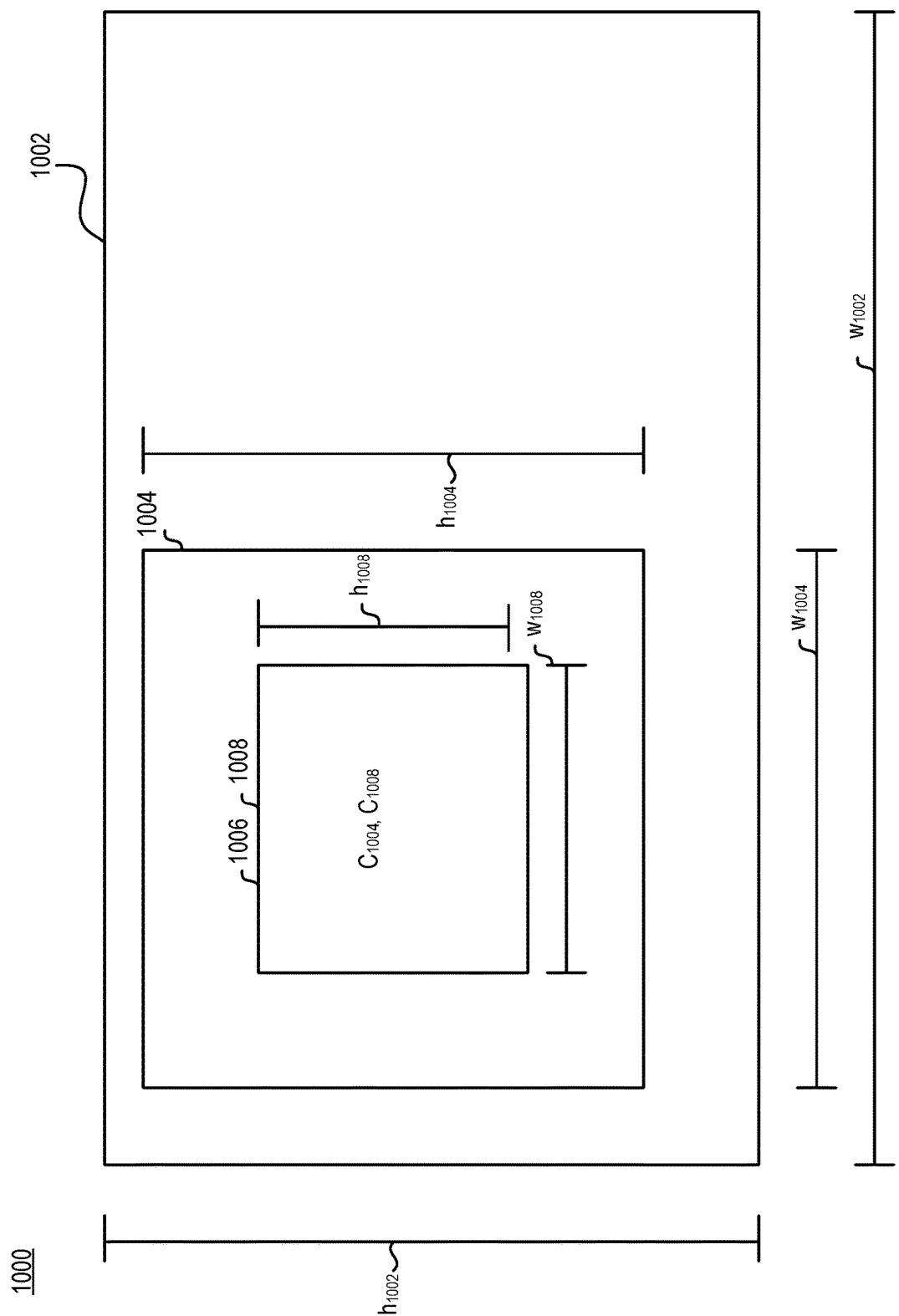
FIG. 10 is a logical block diagram illustrating the improved technique, discussed above in conjunction with FIG. 4, of generating a thumbnail for an underlying media file, according to one embodiment disclosed herein.

If the interest point detector 118 determines that there is not greater than one point of interest in the media file, then at step 912, the interest point detector 118 defines the point of interest area to include the lone point of interest in the media file. For example, FIG. 10 is a logical block diagram 1000 illustrating the improved technique, discussed above in conjunction with FIG. 9, of generating a thumbnail for an underlying media file, according to one embodiment. As illustrated, a thumbnail area 1004 is overlain atop the media file 1002. Media file 1002 has height, $h_{1002}$, and width, $w_{1002}$. The thumbnail area 1004 has a width, $w_{1004}$, and a height, $h_{1004}$. In this example, neither the height, $h_{1002}$, nor the width, $h_{1004}$, is preserved; thus, the thumbnail area 1004 does not preserve any dimension of the media file 1002. Rather, as illustrated, the width, $w_{1004}$, of the thumbnail area 1004 is less than the width, $w_{1002}$, of the media file 1002, and the height, $h_{1004}$, of the thumbnail area 1004 is less than the height, $h_{1002}$, of the media file 1002. In the embodiment depicted in FIG. 1000, interest point detector 118 has identified a single interest point 1006. Accordingly, interest point detector 118 defines the interest point 1006 as an interest point area 1008. The interest point area 1008 has a height, $h_{1008}$, and a width, $w_{1008}$.

Referring back to FIG. 9, if, however, interest point detector 118 determines that there is greater than one point of interest in the media file, then at step 914, the interest point detector 118 defines the point of interest area to include each point of interest in the media file.

Optionally, at step 915, the user may select to scale the interest point area. For example, the user may select to scale in or scale out with respect to the interest point to provide a "zooming-in" or "zooming-out" effect, respectively. In some embodiments, the user may provide pre-set instructions to scale in/out the interest point area. In other embodiment, the user may dynamically instruct the positioning agent 120 to scale in/out the interest point area.

After the interest point area (e.g., interest point area 1008) is defined, at step 916, positioning agent 120 positions the thumbnail area vertically. At step 918, the positioning agent 120 determines whether the interest point area height is greater than a scalar multiple of the thumbnail area height. If the positioning agent 120 determines that the interest point height is greater than a scalar multiple of the height of the thumbnail area, then at step 920, positioning agent 120 aligns a center of the thumbnail area with a center of the interest point area. In a specific example, the positioning agent 120 compares the interest point height to 50% of the thumbnail area height. If the positioning agent 120 determines that the interest point area height is greater than 50% of the thumbnail area height, then positioning agent 120 aligns a center of the thumbnail area with a center of the interest point area. Mathematically, this may be represented as $h_{interestpointarea} > 0.5(h_{thumbnailarea})$.

Referring back to FIG. 10, the positioning agent 120 calculates the height of the interest point area 1008. The positioning agent 120 would then compare the calculated height of the interest point area 1008 to the thumbnail area 1004 height. As illustrated, the interest point height 1008 is greater than 50% of the height of the thumbnail area 1004. Accordingly, the center, $C_{1004}$, of the thumbnail area 1004 is aligned with the center, $C_{1008}$, of the interest point area 1008.

Referring back to FIG. 9, if, however, at step 920 the positioning agent 120 determines that the calculated height of the interest point area is less than a scalar multiple of the height of the thumbnail area, then at step 922, the positioning agent 120 aligns the thumbnail area according to the predetermined set of rules. In a specific example, the positioning agent 120 compares the interest point area height to 50% of the thumbnail area height. If the positioning agent 120 determines that the interest point area height is less than 50% of the thumbnail area height, then positioning agent 120 aligns the thumbnail area according to the predefined set of rules. Mathematically, this may be represented as $h_{interestpointarea} < 0.5(h_{thumbnailarea})$.

Figure 11:
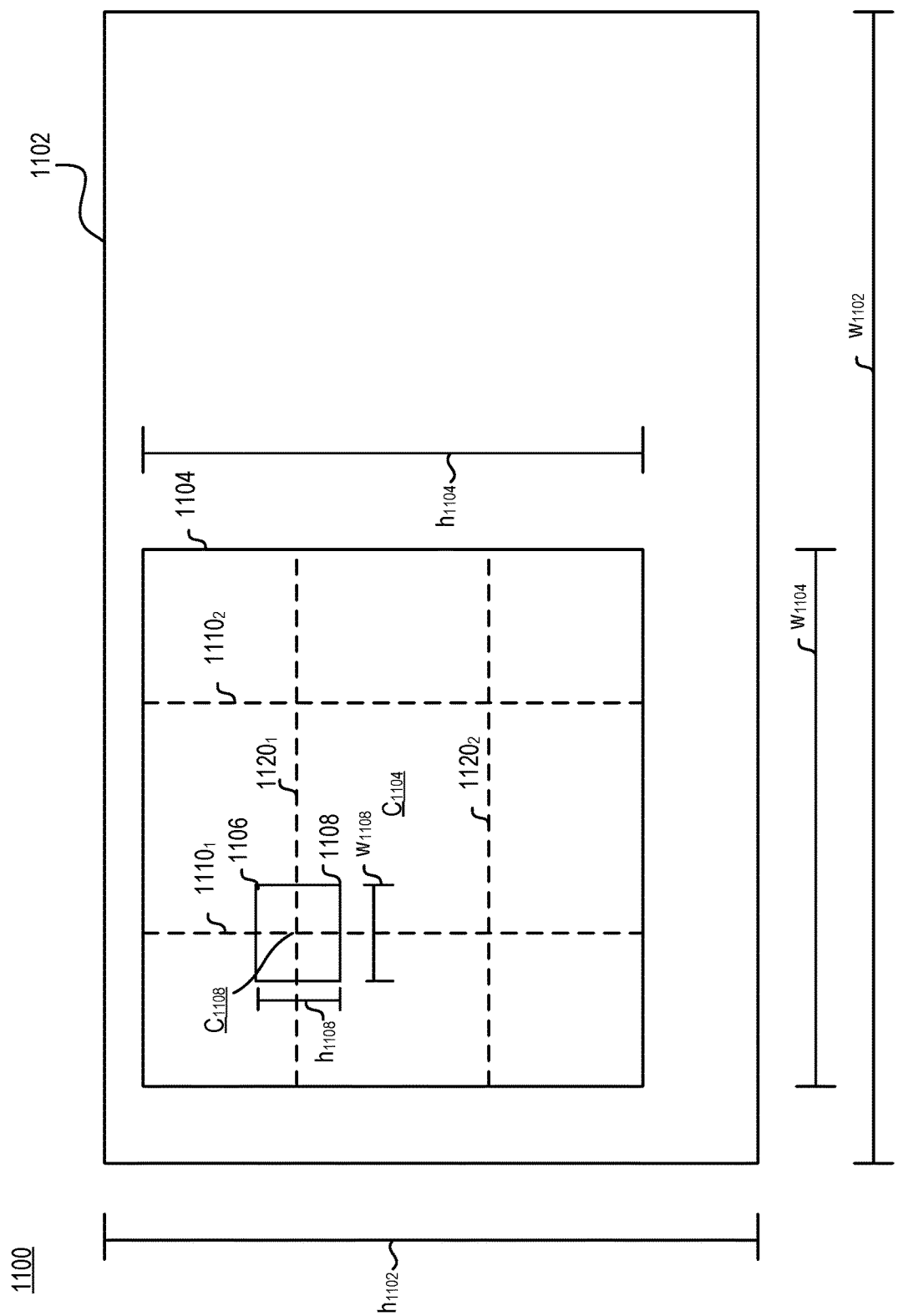
FIG. 11 is a logical block diagram illustrating the improved technique, discussed above in conjunction with FIG. 4, of generating a thumbnail for an underlying media file, according to one embodiment disclosed herein.

FIG. 11 is a logical block diagram 1100 illustrating the improved technique, discussed above in conjunction with FIG. 9, of generating a thumbnail for an underlying media file, according to one embodiment. As illustrated, a thumbnail area 1104 is overlain atop the media file 1102. Media file 1102 has a height, $h_{1102}$, and a width, $w_{1102}$. Thumbnail area 1104 has a height, $h_{1104}$, and a width, $w_{1104}$. The height, $h_{1104}$, and the width, $w_{1104}$ of the thumbnail area 1104, are less than the height, $h_{1102}$, and the width, $w_{1102}$, of the media file, respectively. In the media file 1102, the interest point detector 118 has identified interest point area 1108 containing interest point 1106. Interest point area 1108 has a height, $h_{1108}$, and a width, $w_{1108}$. As illustrated, the interest point area 1108 has a height, $h_{1108}$, that is less than 50% of the height, $h_{1104}$, of the thumbnail area 1104.

The rule-of-thirds allows the positioning agent 120 to position the interest point area 1108 within the thumbnail area 1106, at a position other than the center, $C_{1106}$, of the thumbnail area 1106. For example, as shown in phantom, horizontal lines $1110_1$, $1110_2$ denote alternative positions to align a center of the thumbnail area 1104, responsive to determining that the height of interest point area 1108 is less than 50% the height of the thumbnail area 1104. In the current example illustrated in FIG. 11, rather than aligning the center, $C_{1104}$, of the thumbnail area 1104 with the center, $C_{1108}$, of the interest point area 1108, the positioning agent 120 aligns the center, $C_{1104}$, of the thumbnail area 1104 with the line $1110_1$, denoting the end boundary of a first third of the thumbnail area 1104.

Referring back to FIG. 9, after interest point area is positioned vertically, at step 924, positioning agent 120 positions the interest point area horizontally by determining the width of the interest point area. At step 926, the positioning agent 120 determines whether the interest point width is greater than the thumbnail area width. If the positioning agent 120 determines that the interest point area width is greater than a scalar multiple of the width of the thumbnail area, then at step 928, positioning agent 120 aligns a center of the interest point area with a center of the thumbnail area. In a specific example, the positioning agent 120 compares the width of the interest point area to 50% of the width of the thumbnail area. If the positioning agent 120 determines that the width of the interest point area is greater than 50% of the width of the thumbnail area, then positioning agent 120 aligns a center of the thumbnail area with a center of the interest point area. Mathematically, this may be represented as $w_{interestpointarea} > 0.5(w_{thumbnailarea})$.

Referring back to FIG. 10, the positioning agent 120 calculates the width of the interest point area 1008. The positioning agent 120 would then compare the calculated width of the interest point area 1008 to the calculated width of the thumbnail area 1004 height. As illustrated, the width of the interest point area 1008 is greater than 50% of the width of the thumbnail area 1004. Accordingly, the center, $C_{1004}$, of the thumbnail area 1004 is aligned with the center, $C_{1008}$, of the interest point area 1008.

Referring back to FIG. 9, if, however, at step 926 the positioning agent 120 determines that the calculated width of the interest point area is less than a scalar multiple of the width of the thumbnail area, then at step 930, the positioning agent 120 aligns the thumbnail area according to the predefined set of rules. In a specific example, the positioning agent 120 compares the width of the interest point area to 50% of the width of the thumbnail area. If the positioning agent 120 determines that the width of the interest point area is less than 50% of the width of the thumbnail area, then positioning agent 120 aligns the thumbnail area according to the predefined set of rules. Mathematically, this may be represented as $w_{interestpointarea} < 0.5(w_{thumbnailarea})$.

Referring back to FIG. 11, shown in phantom are vertical lines 1120₁, 1120₂ denote alternative positions to align a center of the thumbnail area 1104, responsive to determining that the width of interest point area 1108 is less than 50% the width of the thumbnail area 1104. In the current example illustrated in FIG. 11, rather than aligning the center, $C_{1104}$, of the thumbnail area 1104 with the center, $C_{1108}$, of the interest point area 1108, the positioning agent 120 aligns the center, $C_{1104}$, of the thumbnail area 1104 with the line 1110₁, denoting the end boundary of a first third of the thumbnail area 1104. Thus, the method 900 identifies whether both the width and the height of the interest point area are less than the width and the height of the thumbnail area, respectively, to align the thumbnail area both vertically and horizontally within the media file.

Referring back to FIG. 9, the positioning agent generates the offset of the thumbnail area (step 932). An offset may be needed in situations in which the interest point of the media file is near a boundary of the media file. For example, an offset may be needed in a situation where the interest point of the media file is in a position where, if the center of the thumbnail area is aligned with the center of the interest point area, a portion of the thumbnail area extends past the media file. The offset may be calculated similarly to that provided below in conjunction with FIG. 4 and FIGS. 8A, 8B.

At step 934, the positioning agent 120 determines if there is a non-zero translation value of the interest point area. To determine if there is a non-zero translation value of the interest point area, the positioning agent calculates the length of the overlap area, and subsequently shifts the thumbnail area an amount substantially equal to the length to offset the overlap area. Accordingly, if there is a non-zero overlap value of the interest point area, then at step 936, the positioning agent 120 translates the thumbnail area an amount to offset the non-zero overlap value. If, however, the overlap value is zero (i.e., there is no overlap of the thumbnail area over the media file), then at step 938, the positioning agent 120 maintains the alignment (i.e., maintains the alignment determined in steps 916, 924).

After the positioning agent 120 generates the offset, the web client application server 116 displays the thumbnail on the user's webpage (step 940). The thumbnail includes the all information of the media file captured in the thumbnail area.

Figure 12:
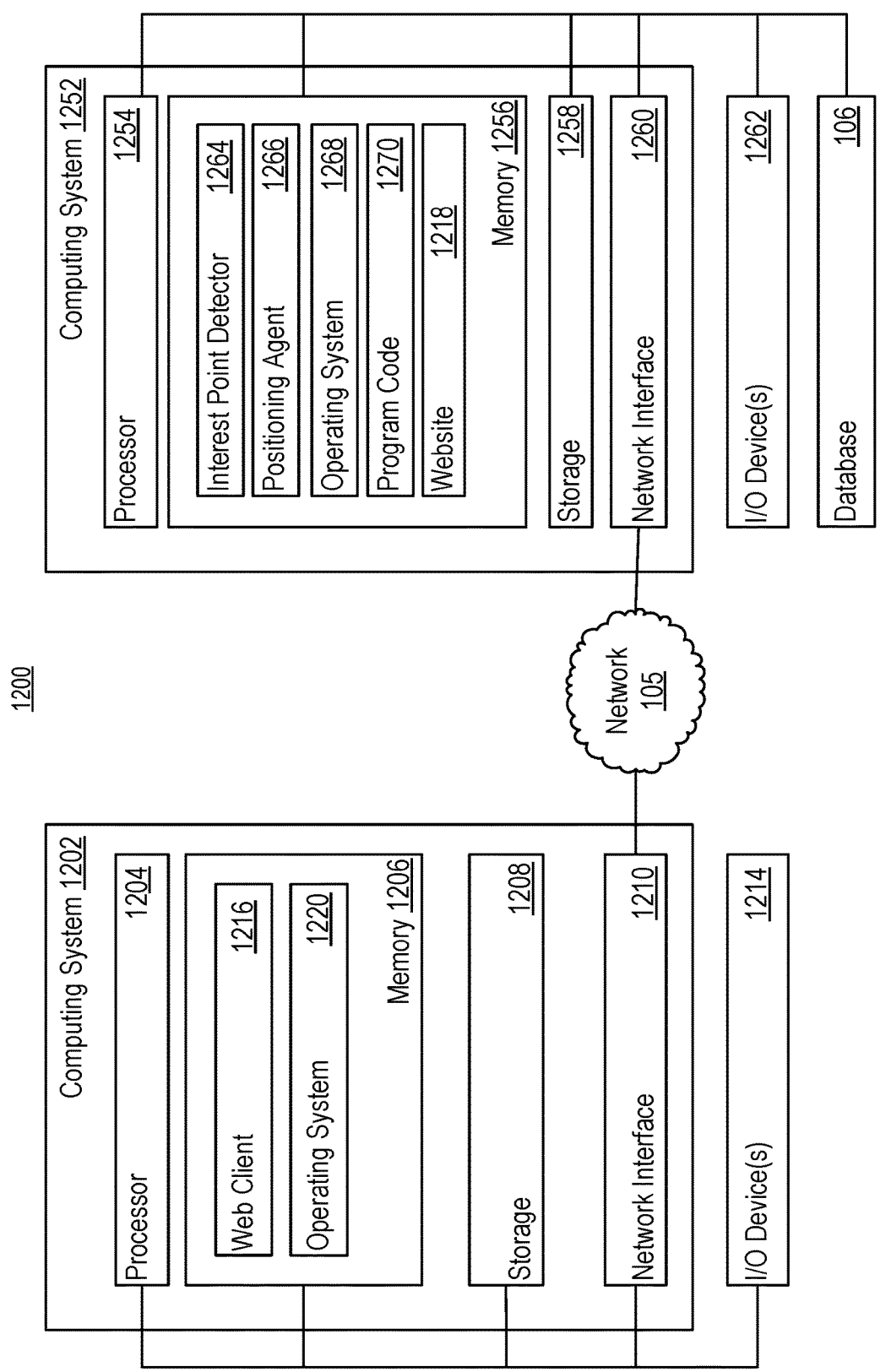
FIG. 12 is a block diagram of a computing platform, according to one embodiment disclosed herein.

FIG. 12 is a block diagram of a computing platform 1200, according to one embodiment. The computing platform 1200 includes a computing system 1202 (e.g., client device 102), a computing system 1252 (e.g., we client application server 116), and database 106, communicating over network 105.

The computing system 1202 includes a processor 1204, a memory 1206, storage 1208, and a network interface 1210. The computing system 1202 may be coupled to one or more I/O device 1214. The processor 1204 may be any processor capable of performing the functions described herein. The computer system 1202 may connect to the network 105 using the network interface 1210. Furthermore, as will be understood by one of ordinary skill in the art, any computer system capable of performing the functions described herein may be used.

In the embodiment, shown in FIG. 12, the memory 1206 includes web client 1216. The web client 1216 is configured to access webpages and/or media content managed by web client application server. The web client 1216 may access a webpage 1218. The webpage 128 may correspond to a user's personal webpage from a photo sharing and/or image hosting platform. In the pictured embodiment, the memory 1206 contains an operating system. Although memory 1206 is shown as a single entity, memory 1206 may include one or more memory devices having blocks of memory associated with physical addresses, such as random access memory (RAM), read only memory (ROM), flash memory, or other types of volatile and/or non-volatile memory. The memory 1206 is an example of tangible media configured to store data, such as trace data, APIs invoked, and the like. Other types of tangible media include floppy disks, removable hard drives, optical storage media, such as CD-ROMs and DVDs, bar codes, and the like.

The computing system 1252 includes a processor 1254, a memory 1256, storage 1258, and a network interface 1260. The computer system 1252 may be coupled to one or more I/O device 1262. The processor 1254 may be any processor capable of performing the functions described herein. The computer system 1252 may connect to the network 105 using the network interface 1260. Furthermore, as will be understood by one of ordinary skill in the art, any computer system capable of performing the functions described herein may be used.

In the embodiment, shown in FIG. 12, the memory 1256 includes interest point detector 1264, positioning agent 1266, and webpage 1218 accessed by the computing system 1202. The interest point detector 1264 is configured to identify one or more interest points in a media file. For example, the interest point detector 1264 may leverage metadata associated with the media file to determine the point of interest therein. The positioning agent 1266 is configured to aid in generating a thumbnail of the media file by selectively positioning the thumbnail region with respect to the interest points in the media file. In the pictured embodiment, the memory 1256 contains an operating system 1268 and program code 1270. Although memory 1256 is shown as a single entity, memory 1256 may include one or more memory devices having blocks of memory associated with physical addresses, such as random access memory (RAM), read only memory (ROM), flash memory, or other types of volatile and/or non-volatile memory. The program code 1270 is configured to carry out the method for generating a thumbnail of a media file, in conjunction with FIGS. 4 and 9, respectively. The memory 1256 is an example of tangible media configured to store data, such as trace data, APIs invoked, and the like. Other types of tangible media include floppy disks, removable hard drives, optical storage media, such as CD-ROMs and DVDs, bar codes, and the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present example also relates to an apparatus for performing the operations herein. This apparatus may be specially constructed for the illustrated purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system interconnect.

The structure for a variety of these systems will appear from the description above. In addition, the present examples are not described with reference to any particular programming language, and various examples may thus be implemented using a variety of programming languages.

As described in greater detail herein, embodiments of the disclosure provide a software application through which a user may access a first file storage location, such as a personal web page hosted by a server, on a remote device by a link accessed via a second graphical user interface. The user may upload and/or transfer media files from a second file storage location accessed via the second graphical user interface to the first file storage location. The link may allow a user to send a link via a data network that will allow the user to quickly log in and upload media files from the remote device, which accesses the link. As such, the media files accessible by the remote device may be transferred from the second storage location of the remote device to the first storage location.

While the foregoing is directed to embodiments described herein, other and further embodiments may be devised without departing from the basic scope thereof. For example, aspects of the present disclosure may be implemented in hardware or software or in a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (for example, read-only memory devices within a computer such as CD-ROM disks readable by a CD-ROM drive, flash memory, ROM chips or any type of solid-state non-volatile semiconductor memory) on which information is permanently stored; and (ii) writable storage media (for example, floppy disks within a diskette drive or hard-disk drive or any type of solid-state random-access semiconductor memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. A method of generating a thumbnail for a media file, comprising:
   receiving the media file having metadata associated therewith;
   generating an interest point area, wherein the interest point area includes one or more interest points in the media file;
   aligning a thumbnail area with respect to the interest point area, wherein aligning a thumbnail area with respect to the interest point area comprises:
   determining an orientation of the media file;
   responsive to determining that the orientation is a landscape orientation, preserving a height of the media file;
   determining a width of both the thumbnail area and the interest point area; and
   responsive to determining that the width of the interest point area is greater than or equal to a scalar multiple of the width of the thumbnail area, aligning a center of the thumbnail area with a center of the interest point area; and
   displaying a portion of the media file in the thumbnail area, wherein the portion of the media file that is displayed includes at least a portion of the interest point area.

2. The method of claim 1, wherein generating an interest point area comprises:
   scanning the metadata associated with the media file to determine the one or more interest points.

3. The method of claim 1, wherein aligning a thumbnail area with respect to the interest point area, comprises:
   generating an offset of the thumbnail area, comprising:
   determining whether there is a non-zero translation value; and
   responsive to determining that there is a non-zero translation value, translating the thumbnail area to offset the non-zero translation value.

4. The method of claim 1, further comprising:
   scaling the thumbnail area.

5. A method of generating a thumbnail for a media file, comprising:
   receiving the media file having metadata associated therewith;
   generating an interest point area, wherein the interest point area includes one or more interest points in the media file;
   aligning a thumbnail area with respect to the interest point area, wherein aligning a thumbnail area with respect to the interest point area comprises:
   determining an orientation of the media file;
   responsive to determining that the orientation is a portrait orientation, preserving a width of the media file;
   determining a height of both the thumbnail area and the interest point area; and responsive to determining that the height of the interest point area is greater than or equal to a scalar multiple of the height of the thumbnail area, aligning a center of the thumbnail area with a center of the interest point area; and displaying a portion of the media file in the thumbnail area, wherein the portion of the media file that is displayed includes at least a portion of the interest point area.

6. The method of claim 5, wherein generating an interest point area comprises:
scanning the metadata associated with the media file to determine the one or more interest points.

7. The method of claim 5, wherein aligning a thumbnail area with respect to the interest point area, comprises:
generating an offset of the thumbnail area, comprising:
determining whether there is a non-zero translation value; and
responsive to determining that there is a non-zero translation value, translating the thumbnail area to offset the non-zero translation value.

8. The method of claim 5, further comprising:
scaling the thumbnail area.

9. A method of generating a thumbnail for a media file, comprising:
receiving the media file having metadata associated therewith;
generating an interest point area, wherein the interest point area includes one or more interest points in the media file;
aligning a thumbnail area with respect to the interest point area, wherein aligning a thumbnail area with respect to the interest point area comprises:
determining an orientation of the media file;
responsive to determining that the orientation is a landscape orientation, preserving a height of the media file;
determining a width of both the thumbnail area and the interest point area; and
responsive to determining that the width of the interest point area is less than a scalar multiple of the width of the thumbnail area, aligning a center of the thumbnail area with the interest point area according to a predefined set of rules; and
displaying a portion of the media file in the thumbnail area, wherein the portion of the media file that is displayed includes at least a portion of the interest point area.

10. The method of claim 9, wherein generating an interest point area comprises:
scanning the metadata associated with the media file to determine the one or more interest points.

11. The method of claim 9, wherein aligning a thumbnail area with respect to the interest point area, comprises:
generating an offset of the thumbnail area, comprising:
determining whether there is a non-zero translation value; and
responsive to determining that there is a non-zero translation value, translating the thumbnail area to offset the non-zero translation value.

12. The method of claim 9, further comprising:
scaling the thumbnail area.

13. A method of generating a thumbnail for a media file, comprising:
receiving the media file having metadata associated therewith;
generating an interest point area, wherein the interest point area includes one or more interest points in the media file;
aligning a thumbnail area with respect to the interest point area, wherein aligning a thumbnail area with respect to the interest point area comprises:
determining an orientation of the media file;
positioning the thumbnail area vertically, comprising:
determining a width of both the thumbnail area and the interest point area; and
responsive to determining that the width of the interest point area is greater than or equal to a scalar multiple of the width of the thumbnail area, aligning a center of the thumbnail area with a center of the interest point area; and
positioning the thumbnail area horizontally, comprising:
determining a height of both the thumbnail area and the interest point area; and
responsive to determining that the height of the interest point area is greater than or equal to a scalar multiple of the height of the thumbnail area, aligning a center of the thumbnail area with a center of the interest point area; and
displaying a portion of the media file in the thumbnail area, wherein the portion of the media file that is displayed includes at least a portion of the interest point area.

14. The method of claim 13, wherein generating an interest point area comprises:
scanning the metadata associated with the media file to determine the one or more interest points.

15. The method of claim 13, wherein aligning a thumbnail area with respect to the interest point area, comprises:
generating an offset of the thumbnail area, comprising:
determining whether there is a non-zero translation value; and
responsive to determining that there is a non-zero translation value, translating the thumbnail area to offset the non-zero translation value.

16. The method of claim 13, further comprising:
scaling the thumbnail area.

17. A system, comprising:
a processor; and
a memory having instructions stored thereon, which, when executed by the processor, performs an operation of generating a thumbnail for a media file, comprising:
receiving the media file having metadata associated therewith;
generating an interest point area, wherein the interest point area includes one or more interest points in the media file;
aligning a thumbnail area with respect to the interest point area, wherein aligning a thumbnail area with respect to the interest point area comprises:
determining an orientation of the media file;
responsive to determining that the orientation is a landscape orientation, preserving a height of the media file;
determining a width of both the thumbnail area and the interest point area; and
responsive to determining that the width of the interest point area is greater than or equal to a scalar multiple of the width of the thumbnail area, aligning a center of the thumbnail area with a center of the interest point area; and displaying a portion of the media file in the thumbnail area, wherein the portion of the media file that is displayed includes at least a portion of the interest point area.

18. The system of claim 17, wherein generating an interest point area comprises:
scanning the metadata associated with the media file to determine the one or more interest points.

19. The system of claim 17, wherein aligning a thumbnail area with respect to the interest point area, comprises:
generating an offset of the thumbnail area, comprising:
determining whether there is a non-zero translation value; and
responsive to determining that there is a non-zero translation value, translating the thumbnail area to offset the non-zero translation value.

20. The system of claim 17, further comprising:
scaling the thumbnail area.

21. A system, comprising:
a processor; and
a memory having instructions stored thereon, which, when executed by the processor, performs an operation of generating a thumbnail for a media file, comprising:
receiving the media file having metadata associated therewith;
generating an interest point area, wherein the interest point area includes one or more interest points in the media file;
aligning a thumbnail area with respect to the interest point area, wherein aligning a thumbnail area with respect to the interest point area comprises:
determining an orientation of the media file;
responsive to determining that the orientation is a portrait orientation, preserving a width of the media file;
determining a height of both the thumbnail area and the interest point area; and
responsive to determining that the height of the interest point area is greater than or equal to a scalar multiple of the height of the thumbnail area, aligning a center of the thumbnail area with a center of the interest point area; and
displaying a portion of the media file in the thumbnail area, wherein the portion of the media file that is displayed includes at least a portion of the interest point area.

22. The system of claim 21, wherein generating an interest point area comprises:
scanning the metadata associated with the media file to determine the one or more interest points.

23. The system of claim 21, wherein aligning a thumbnail area with respect to the interest point area, comprises:
generating an offset of the thumbnail area, comprising:
determining whether there is a non-zero translation value; and
responsive to determining that there is a non-zero translation value, translating the thumbnail area to offset the non-zero translation value.

24. The system of claim 21, further comprising:
scaling the thumbnail area.

25. A system, comprising:
a processor; and
a memory having instructions stored thereon, which, when executed by the processor, performs an operation of generating a thumbnail for a media file, comprising:
receiving the media file having metadata associated therewith;
generating an interest point area, wherein the interest point area includes one or more interest points in the media file;
aligning a thumbnail area with respect to the interest point area, wherein aligning a thumbnail area with respect to the interest point area comprises:
determining an orientation of the media file;
responsive to determining that the orientation is a landscape orientation, preserving a height of the media file;
determining a width of both the thumbnail area and the interest point area; and
responsive to determining that the width of the interest point area is less than a scalar multiple of the width of the thumbnail area, aligning a center of the thumbnail area with the interest point area according to a predefined set of rules; and
displaying a portion of the media file in the thumbnail area, wherein the portion of the media file that is displayed includes at least a portion of the interest point area.

26. The system of claim 25, wherein generating an interest point area comprises:
scanning the metadata associated with the media file to determine the one or more interest points.

27. The system of claim 25, wherein aligning a thumbnail area with respect to the interest point area, comprises:
generating an offset of the thumbnail area, comprising:
determining whether there is a non-zero translation value; and
responsive to determining that there is a non-zero translation value, translating the thumbnail area to offset the non-zero translation value.

28. The system of claim 25, further comprising:
scaling the thumbnail area.

29. A system, comprising:
a processor; and
a memory having instructions stored thereon, which, when executed by the processor, performs an operation of generating a thumbnail for a media file, comprising:
receiving the media file having metadata associated therewith;
generating an interest point area, wherein the interest point area includes one or more interest points in the media file;
aligning a thumbnail area with respect to the interest point area, wherein aligning a thumbnail area with respect to the interest point area comprises:
determining an orientation of the media file;
positioning the thumbnail area vertically, comprising:
determining a width of both the thumbnail area and the interest point area; and
responsive to determining that the width of the interest point area is greater than or equal to a scalar multiple of the width of the thumbnail area, aligning a center of the thumbnail area with a center of the interest point area; and
positioning the thumbnail area horizontally, comprising:
determining a height of both the thumbnail area and the interest point area; and
responsive to determining that the height of the interest point area is greater than or equal to a scalar multiple of the height of the thumbnail area, aligning a center of the thumbnail area with a center of the interest point area; and displaying a portion of the media file in the thumbnail area, wherein the portion of the media file that is displayed includes at least a portion of the interest point area.

30. The system of claim 29, wherein generating an interest point area comprises:
scanning the metadata associated with the media file to determine the one or more interest points.

31. The system of claim 29, wherein aligning a thumbnail area with respect to the interest point area, comprises:
generating an offset of the thumbnail area, comprising:
determining whether there is a non-zero translation value; and
responsive to determining that there is a non-zero translation value, translating the thumbnail area to offset the non-zero translation value.

32. The system of claim 29, further comprising:
scaling the thumbnail area.

33. A non-transitory computer readable medium having instructions stored thereon, which, when executed by a processor, cause the processor to perform a method of generating a thumbnail for a media file, comprising:
receiving the media file having metadata associated therewith;
generating an interest point area, wherein the interest point area includes one or more interest points in the media file;
aligning a thumbnail area with respect to the interest point area, wherein aligning a thumbnail area with respect to the interest point area comprises:
determining an orientation of the media file;
responsive to determining that the orientation is a landscape orientation, preserving a height of the media file;
determining a width of both the thumbnail area and the interest point area; and
responsive to determining that the width of the interest point area is greater than or equal to a scalar multiple of the width of the thumbnail area, aligning a center of the thumbnail area with a center of the interest point area; and
displaying a portion of the media file in the thumbnail area, wherein the portion of the media file that is displayed includes at least a portion of the interest point area.

34. The non-transitory computer readable medium of claim 33, wherein generating an interest point area comprises:
scanning the metadata associated with the media file to determine the one or more interest points.

35. A non-transitory computer readable medium having instructions stored thereon, which, when executed by a processor, cause the processor to perform a method of generating a thumbnail for a media file, comprising:
receiving the media file having metadata associated therewith;
generating an interest point area, wherein the interest point area includes one or more interest points in the media file;
aligning a thumbnail area with respect to the interest point area, wherein aligning a thumbnail area with respect to the interest point area comprises:
determining an orientation of the media file;
responsive to determining that the orientation is a portrait orientation, preserving a width of the media file;
determining a height of both the thumbnail area and the interest point area; and
responsive to determining that the height of the interest point area is greater than or equal to a scalar multiple of the height of the thumbnail area, aligning a center of the thumbnail area with a center of the interest point area; and
displaying a portion of the media file in the thumbnail area, wherein the portion of the media file that is displayed includes at least a portion of the interest point area.

36. The non-transitory computer readable medium of claim 35, wherein generating an interest point area comprises:
scanning the metadata associated with the media file to determine the one or more interest points.

* * * * *